United States Patent
Orsén

(10) Patent No.: US 6,666,999 B1
(45) Date of Patent: Dec. 23, 2003

(54) GAS ASSISTED MOULDING

(75) Inventor: Mikael Orsén, Åkersberga (SE)

(73) Assignee: AGA Aktiebolag, Lidingo (SE)

( * ) Notice: Subject to any disclaimer, the term of this patent is extended or adjusted under 35 U.S.C. 154(b) by 0 days.

(21) Appl. No.: 10/129,603

(22) PCT Filed: Nov. 2, 2000

(86) PCT No.: PCT/SE00/02152
§ 371 (c)(1),
(2), (4) Date: May 8, 2002

(87) PCT Pub. No.: WO01/34363
PCT Pub. Date: May 17, 2001

(30) Foreign Application Priority Data

Nov. 10, 1999 (SE) ............................................. 9904062

(51) Int. Cl.[7] .............................................. B29C 49/66
(52) U.S. Cl. ........................... 264/85; 264/572; 425/130
(58) Field of Search .................. 264/85, 572; 425/130

(56) References Cited

U.S. PATENT DOCUMENTS

| | | | |
|---|---|---|---|
| 5,096,655 A | 3/1992 | Baxi et al. | |
| 5,204,050 A | 4/1993 | Loren | |
| 5,423,667 A | 6/1995 | Jaroschek | |
| 6,019,935 A | * 2/2000 | Eckardt et al. | ............. 264/572 |

FOREIGN PATENT DOCUMENTS

| | | |
|---|---|---|
| DE | 39 25 909 A1 | 2/1991 |
| DE | 40 24 549 A1 | 2/1992 |

* cited by examiner

*Primary Examiner*—Suzanne E. McDowell
(74) *Attorney, Agent, or Firm*—Pearne & Gordon LLP

(57) ABSTRACT

The present invention relates to the fabrication of a moulded detail in a gas assisted moulding process, wherein molten polymer (23) is injected into the mould cavity (21) of a moulding tool, pressurized fluid (25) is supplied to the mould cavity through at least a first opening (22) to form a cavity (26) in the polymer and force the polymer towards the inner walls of the mould cavity, pressurized fluid (27) is thereafter supplied to the mould cavity through at least a second opening (24) localized remotely front said first opening to form a passage (28) through the polymer to said cavity, the polymer is cooled, pressurized fluid is removed and the mould cavity is opened to remove the moulded detail. The invention comprises that substantially equal amounts of pressurized fluid are supplied to the mould cavity through at least one of said openings (22, 24) and are simultaneously removed from the mould cavity through at least an other of said openings (24, 22), while the polymer being cooled, the pressure being held substantially constant in said mould cavity and the supplied amount having a lower temperature than the removed amount, such that heat (Q) is conveyed from the mould cavity via the arisen fluid flow and the cooling is speeded up.

24 Claims, 4 Drawing Sheets

GAS ASSISTED MOULDING

This application claims the benefit of International Application Number PCT/SE00/02152, which was published in English on May 17, 2001.

TECHNICAL FIELD

The present invention generally relates to moulding and specifically to a method and an apparatus, respectively, for gas assisted moulding.

TECHNICAL BACKGROUND

Moulding is a manufacturing technique, wherein a polymer is injected into a moulding tool under pressure and solidifies. The moulding tool is substantially a negative of the detail which is to be manufactured. Conventional injection pressures vary from 5000 to 20000 psi. Since these high pressures occur, the moulding tool, which often consists of two mould halves, must be held in a clamped state during injection and cooling. This clamping force needs to be considerably high.

The moulding technique can be used for the manufacturing of a large number of details with a very high precision. Tolerances better than 0.0025 mm are easily achieved by using a suitable combination of mould design, material and detail design. Further, moulding is a high-capacity process. Cycle times vary from a few seconds to several minutes in dependence on the size and form of the moulded detail.

The moulding tools are relatively expensive and they have to be designed to offer the high precision and at the same time be sufficiently robust to withstand the high pressures that occur. They may be fabricated in aluminium but are preferably fabricated in hardened tool steel in order to be usable during a long time. Thus, the moulding technique is particularly preferable when a large number of details are to be manufactured.

Gas assisted moulding (also called GAM, gas assisted injection moulding, or GID, Gasinnendruck), which is an improvement of the moulding technique and which relatively recently has been commercialized, allows sections of the interior of a product to be removed or, simply, that hollow products can be manufactured. The technique, in the following denoted gas assisted moulding, is suitable for the manufacturing of thicker products, such as handles, as well as products having thinner walls.

The technique comprises that a moulded detail is pressurized with a gas via a network of flow channels or directly in the moulded detail prior to allowing the injected material to solidify. The pressurized gas provides the packing force required for the manufacturing of a hollow moulded quality detail.

An overview of gas assisted moulding including discussions of the technique as well as applications is found in "Gas Assisted Moulding", T. C. Pearson, Rapra Review Report, No. 103, 1998. In the overview the choice of equipment is discussed, including e.g. positioning and time adjustments of gas injection, and dimensions and positioning of gas channels.

Advantages of gas assisted moulding includes that less material is consumed to manufacture the detail (up to 45% less consumption), that better dimension stability can be achieved, that shrinkage marks, i.e. hot spots, can be eliminated, that details having higher strength and rigidity can be manufactured, that cycle times can be reduced, that moulding induced stresses in the material of the detail can be heavily reduced, and that a lower clamping force is required.

The use of a pressurized gas for assistance during conventional moulding of polymer is believed to have been commercially applicable by means of an invention by Friederich, which was patented 1978, see U.S. Pat. No. 4,101,617. The invention relates to moulding of hollow articles in a single step, wherein a compressed gas is introduced together with, or directly after, the injection of molten polymer in the article-defining mould.

Further, different particular aspects of gas assisted moulding have been patented during later years, see e.g. the patents U.S. Pat. No. 5,728,329; U.S. Pat. No. 5,662,841; U.S. Pat. No. 5,558,824; U.S. Pat. No. 5,705,201; U.S. Pat. No. 5,411,685; U.S. Pat. No. 5,110,553; U.S. Pat. No. 5,069,858; and U.S. Pat. No. 5,204,050; and references therein.

The three first mentioned of these patents relate to the pressurizing of a gas in the mould prior to injection of the molten polymer therein and generation of a static pressure with the molten polymer. The third one particularly depicts a technique for controlling the exhaust of the initial gas, whereby the flow front and the expansion velocity of the injected molten polymer are modulated in order to achieve a uniform material flow in the mould to minimize marks due to non-uniform flow in order to ensure that no gas blows occur in the material flow and to achieve articles having a more uniform wall thickness.

Further, the fourth patent discloses a vibration-based process to modify the injection moulding and/or the properties of the mould material.

The fifth patent depicts a gas control unit for a gas assisted moulding system, wherein an amount of gas is introduced in the mould in combination with an amount of polymer material during injection moulding.

The sixth and the seventh patents show process methods to enhance the surface quality of the manufactured articles.

The first mentioned of these patents comprises first to inject a considerable amount of polymer in the mould and thereafter to simultaneously inject pressurized gas and a further amount of polymer. The introduction of the pressurized gas prevents first that the first polymer flow is stopped and thereafter, subsequent to the introduction of the additional amount of polymer, the gas distributes the total amount of molten polymer in the article-defining mould. Particular ranges for the gas pressure and for the mutual relation between the two polymer amounts are given.

The latter of these patents depicts a moulding process, wherein a first amount of pressurized gas is assisting during moulding, but does not enter the article-defining mould, but enters in a volume substantially adjacent to the mould in order to assist at the filling out of the mould.

Finally, the eighth patent depicts a method and a device, respectively, wherein an article is manufactured by injecting molten polymer into a mould and by injecting an amount of pressurized gas in the polymer in order to fill out the mould and create a cavity in the polymer. Thereafter gas is injected into the polymer in the mould at a second position, which either forms a separate cavity in the polymer or which forms a passage through the polymer into the former cavity. The first gas is preferably injected at the same position as the polymer is injected and the latter gas can be injected at a position having a direct communication with the mould. The gas is vented when the article has solidified enough such that occurring valves, discharge outlets or the like will not be clogged. This venting may be performed from either one of the injection positions or from both, simultaneously or in some sequential order. This technique exhibits advantages comprising i.a. short cycle times, minimization of operation stops, low material consumption and manufacturing of articles of high quality.

The present invention relates to a further enhanced technique during manufacturing by gas assisted moulding, which exhibits the advantage of the above mentioned technique but which also simultaneously provides for further reduced cycle times.

SUMMARY OF THE INVENTION

Thus, it is a main object of the present invention to provide a method for effective, fast and reliable gas assisted moulding having considerably shortened cycle times.

A further object of the invention is to provide a method, which provides for manufacturing of high-quality products having high strength and rigidity without any shrinkage marks or moulding induced stresses.

Still a further object of the invention is to provide a method for moulding of products, wherein the consumption of primary material is low.

Yet a further object of the invention is to provide a method, wherein the cooling of the moulded product can be controlled.

Still a further object of the invention is to provide an apparatus, wherein said method for moulding can be implemented.

These and other objects of the invention are attained by a method and an apparatus according to the appended patent claims.

An advantage of the invention is that the cycle times can be considerably reduced compared to prior art techniques, possibly by at least up to 30%.

Further advantages of the invention and characteristics thereof will be apparent from the following description.

SHORT DESCRIPTION OF THE DRAWINGS

The invention will be described closer below with reference to FIGS. 1–9, which are only shown to illustrate the invention and shall therefore in no way limit the same.

DETAILED DESCRIPTION OF PREFERRED EMBODIMENTS

In the following description, for the purpose of explaining and not limiting the invention, specific details are set forth, such as particular applications, techniques, etc., in order to provide a thorough understanding of the present invention. However, it will be apparent to the man skilled in the art that the invention can be practised in other embodiments than these.

The invention will be described closer with parallel references on the one hand to FIG. 1, which is a flow scheme of a method for gas assisted moulding, and on the other hand to FIGS. 2–8, which illustrate a device for gas assisted moulding during different phases of the inventive method of FIG. 1.

Figure 2:
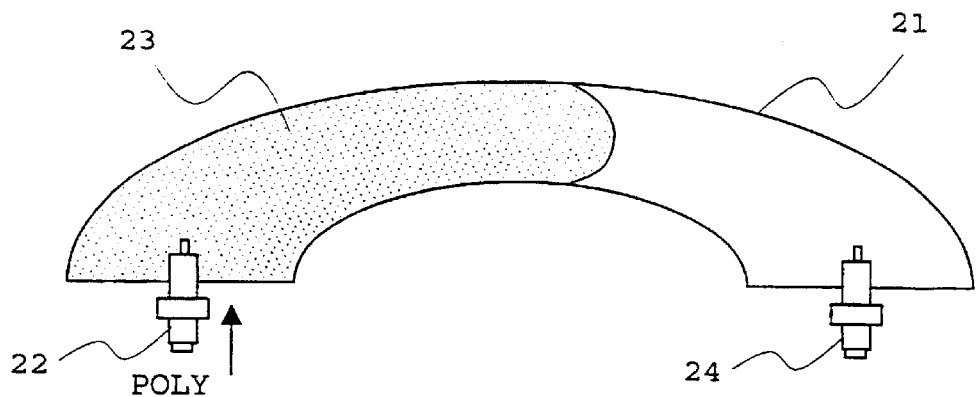
FIGS. 2–8 show schematically, in cross-section, an apparatus for gas assisted moulding during different phases of the inventive method shown in FIG. 1.

Reference numeral 21 in FIG. 2 refers to a mould cavity of a moulding tool intended for gas assisted moulding. In the illustrated case a mould cavity is shown, which is intended for moulding of hollow handles but the present invention is applicable for moulding of a large variety of products including both wider and thinner parts. It shall be appreciated that any kind of moulding tool known within the technical field can be modified to incorporate the present invention. A moulding tool as disclosed in said U.S. Pat. No. 5,204,050 may e.g. be used for that purpose.

The moulding tool comprises an opening in the one end of the mould cavity, where a valvle-controlled nozzle 22 is arranged. Further, the nozzle is in communication with a controllable feeding system of a standard type (not shown) for injection of the raw material.

In a step 11 (FIG. 1) an amount of molten polymer of a typical temperature of about 200° C. is injected into the mould cavity 21 through the above mentioned nozzle 22. In FIG. 2 the polymer is indicated by 23, the front of which has here reached about halfway into the mould cavity 21. The fact that the injecting is under progress is indicated by the arrow POLY. Further, the moulding tool comprises a second opening, wherein a second valve 24 is mounted, said valve having an important function in the present invention, which will be described in detail further down in the description.

Subsequently, preferably after the injection of the molten polymer having been completely ended, a predetermined amount of pressurized gas, preferably an inert gas, such as nitrogen or a nitrogen-containing gas mixture, is in a step 12 injected into the molten polymer in the mould cavity through the same nozzle 23. The nozzles shall then be connected to a controllable gas system for controlled supply of gas. Alternatively, the moulding tool is provided with a separate gas supply nozzle at a separate opening for supply of the pressurized gas. Time adjustment, pressure, temperature and velocity of the supplied gas are critical parameters, which have to be accurately controlled.

Figure 3:
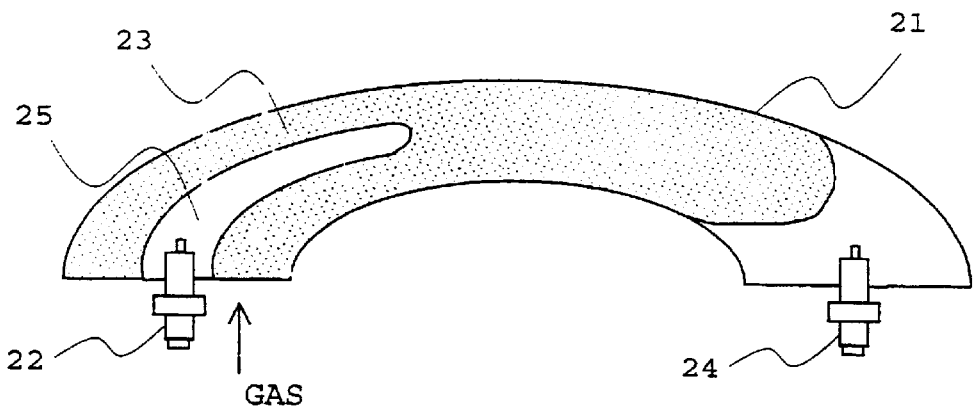

The pressurized injected gas is in FIG. 3 indicated by 25. An arrow denoted GAS indicates that the gas injection is in progress. Since the polymer is cooled from the inner wall of the mould cavity, a temperature gradient arises perpendicularly to the flow direction with the highest temperature and thereby the lowest viscosity in the center. Thus, the gas chooses the natural way through the low viscous and hotter portions of the polymer towards areas having low pressure.

In this manner the gas creates a cavity, which extends along a central axis from the nozzle 22 and towards the front end of the polymer and thereby forces the molten polymer towards the inner wall of the mould cavity. This step is indicated by 13 in FIG. 1.

Figure 4:
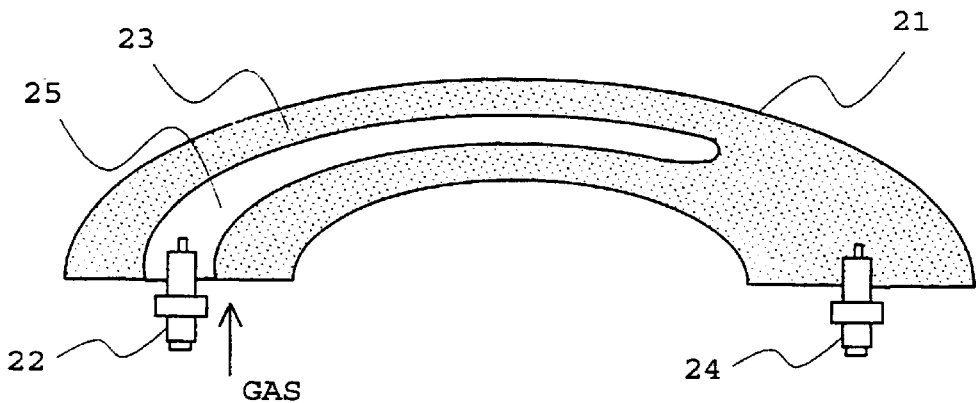

In FIG. 4 is shown the process at a stage where the injection of the polymer is ended and where the polymer has also reached the end of the mould cavity at 24. The gas is though still being injected, which is again indicated by an arrow denoted GAS, and the gas has reached a substantial distance in the mould cavity. By controlling the amount of gas injected into the cavity the pressure, which puts load on the cooling polymer, is controlled. Preferably, a further supply of gas through the nozzle 22 is stopped when the gas has reached a predetermined, estimated distance, e.g. such as the one illustrated in FIG. 4.

Figure 5:
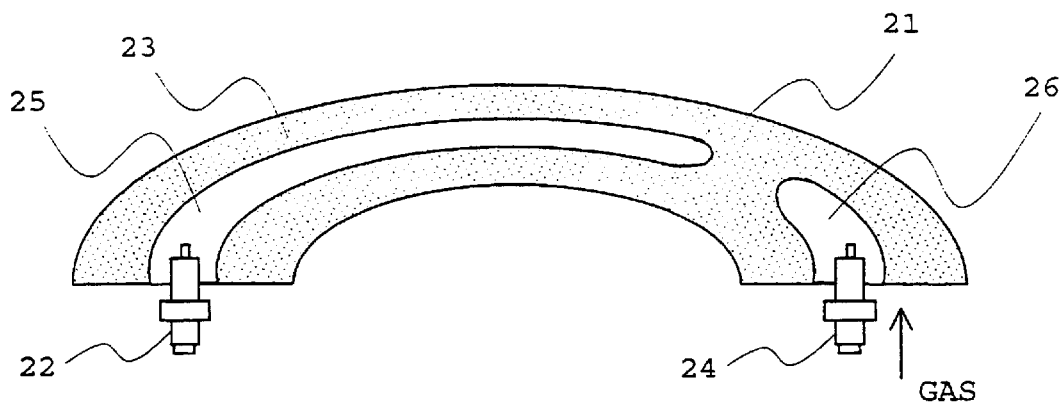

Further, in a step 14, a predetermined amount of pressurized gas is injected through nozzle 24 located on an opposite side of the mould cavity compared to nozzle 22 and into the cooling polymer. In FIG. 5 this step is illustrated by an arrow denoted GAS indicating gas injection in progress through the nozzle 24 and by a gas amount 26, which extends along the above mentioned central axis from the nozzle 24 and in the direction towards the cavity defined by the former amount of pressurized gas. In this respect a further pressure towards the polymer is achieved, which allows for the fabrication of higher-quality details having a more accurately defined form and more uniform surfaces.

Figure 6:
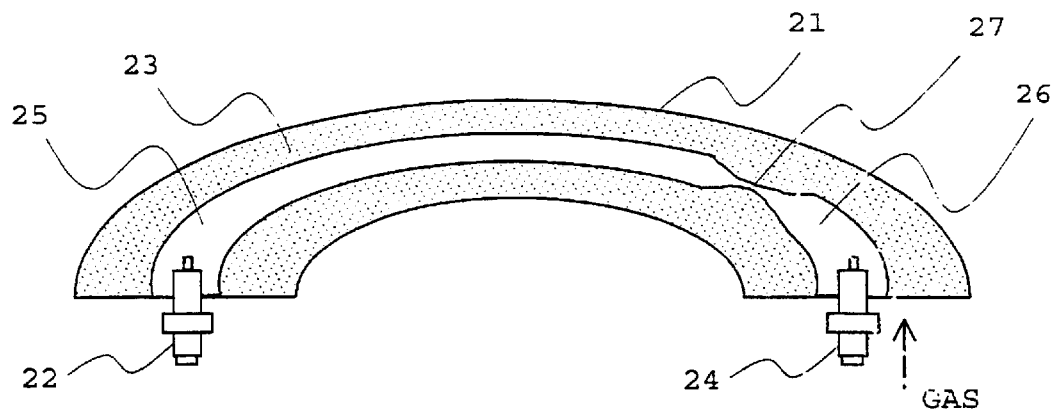

By controlling the supply at 24 so that the pressure in gas 26 is higher than the pressure in gas 25 a pressure gradient along the axis is achieved. Hereby, in a step 15, a passage to cavity 25 can be achieved. In FIG. 6 this is clearly illustrated, wherein said passage is denoted by 27.

During the continued solidifying and cooling process it is important that a uniform pressure is obtained in the mould cavity 21 in order to produce a high-quality detail. The time for this cooling process is normally in the order of 75% of the total cycle time. As mentioned above the cycle time is a very critical parameter for the productivity of a tool and it can vary tremendously in dependence on i.a. tool, mould cavity, detail design, raw material and cooling. Typical values of cycle times are 90–120 seconds. During experiments applicant has established that it is possible to lower the cooling time with up to 50%, which will give a shortened cycle time of up to about 35%. Even if much lower values are achievable in production, every possible reduction of the cycle time is desirable. Also a reduction of 5–10% is regarded as considerable in this respect.

In order to reduce these cooling times, and thereby the cycle times, a further controlled amount of pressurized gas is supplied through nozzle 24 at the same time as an amount of the same size is allowed to flow out of the mould cavity through nozzle 22. The temperature of the supplied gas shall be lower than the temperature of the gas removed in order to being able to convey heat in the mould cavity from the mould cavity via the obtained gas flow. This step is indicated by 16 in FIG. 1.

In such a manner gas is utilized in gas assisted moulding for two different main purposes: partly as a means to deliver necessary packing force of the polymer according to conventional gas assisted moulding, partly as a means to convey heat from the mould cavity through e.g. convection for the purpose of speeding up the cooling. In the latter case the pressurized gas is operating as a heat exchanger.

Figure 7:
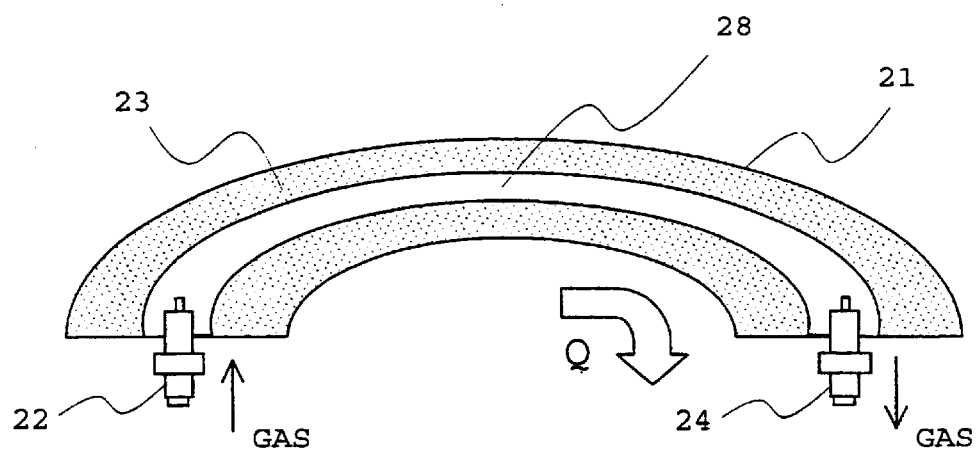
Figure 8:
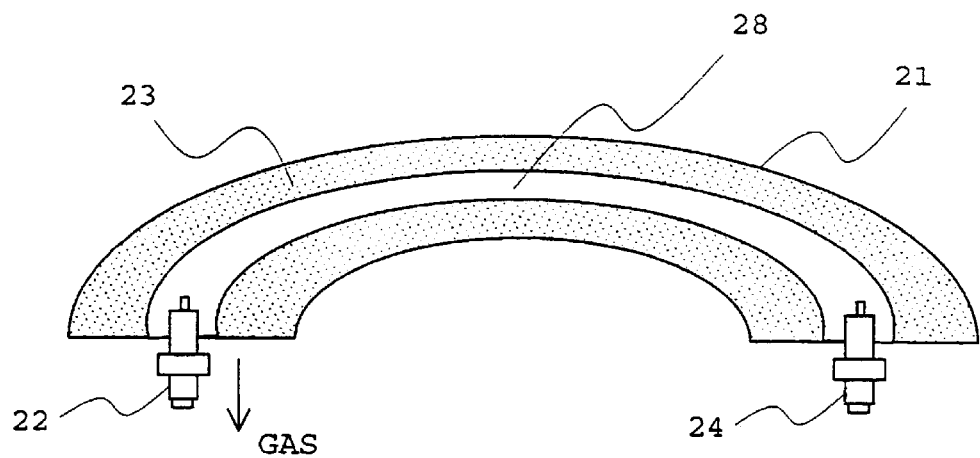

To be able to operate such a function in practice accurate control is required to keep the pressure in the mould cavity within acceptable tolerances during such a flow through the mould cavity. Parameters which can be controlled include amount of gas flowed through the cavity, its velocity and the temperature of the supplied gas. In FIG. 7 the flow through the mould cavity is indicated by arrows denoted GAS at the respective nozzle 22, 24, the heat conveyed is indicated by an arrow denoted Q and the through cavity formed by the pressurized gas is denoted by 28.

Figure 1:
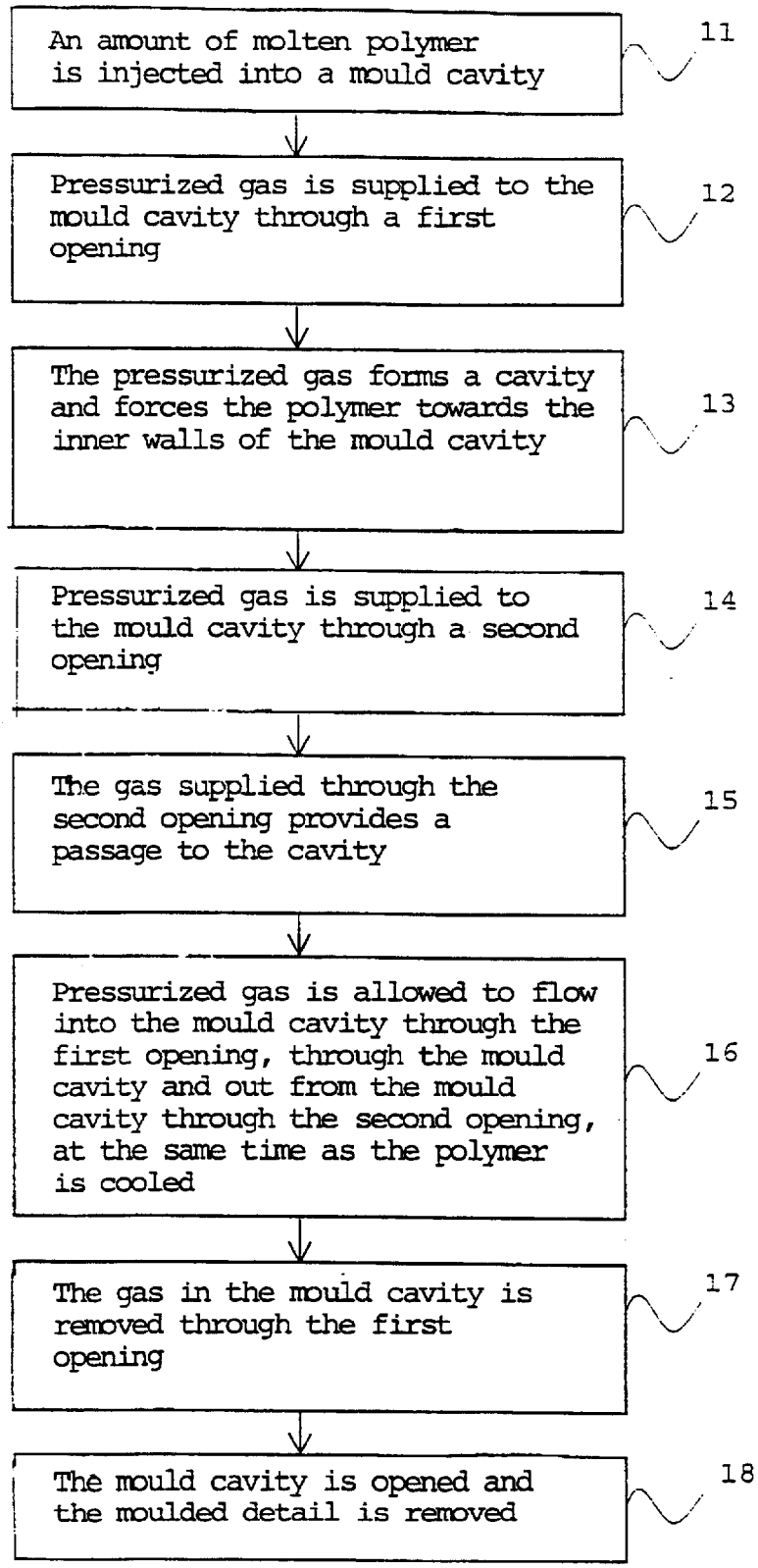
FIG. 1 is a flow scheme illustrating a schematic method in gas assisted moulding according to one embodiment of the present invention.

Thereafter, in a step denoted 17 in FIG. 1, the pressurized gas is vented from the mould cavity. This is also illustrated in FIG. 8, again by an arrow denoted GAS at the nozzle 22.

The venting can certainly also be performed through nozzle 24 but the polymer ought to be coolest at the end at 22, whereby it ought to be an advantage to vent the gas there, since the risk of clogging the nozzle is the lowest there.

Finally, in a step 18, the mould cavity is opened and the finished, moulded detail is removed.

The present invention may alternatively in step 16 comprise that gas is supplied at 24 och removed at 22, such that a flow in the opposite direction is instead achieved. Normally it is, however, most preferable to remove the gas at 24, since the polymer is coolest and has reached furthest in the process of solidifying. The more molten the polymer is, the higher probability that the outlet valve will be clogged or that polymer particles will follow out through the outlet. This is certainly not desirable. In order to prevent this process from occurring the cavity and the nozzles are formed thereafter and further the complete process has to be accurately controlled.

Another critical point concerns the piercing, i.e. the formation of the passage, to the cavity 25 from nozzle 24, which is shown in FIGS. 5 and 6. In practice, the polymer material may limit the size of the passage, such that a through cavity is achieved, which has a structure more similar to the one shown in FIG. 6 (25, 26, 27) than the one shown in FIG. 7 (28). If the passage has a smaller cross section area than the cross section area of the opening of the nozzle 24, problems may arise, as in such an instance the flow resistance in the mould cavity is unknown.

Thus, in order to avoid this, it must as far as possible be arranged so that said passage is achieved with a smallest cross section area, which is larger, preferably considerably larger, than the cross section areas of the openings of the nozzles 24, 22. In the second place, one has to try to form said passage with a smallest cross section area, which is repeatably achievable, such that in each cycle the same flow resistance is obtained. The purpose of this procedure is to achieve a repeatable cooling of the polymer in the mould cavity from cycle to cycle, which is achieved by a repeatable gas flow through the mould cavity, which in turn is achieved by a repeatable flow resistance in the mould cavity.

Further, it is possible first to flow the pressurized gas in one direction and then in an opposite direction. Since the cold gas supplied will cool most effectively at the inlet, a more uniform cooling is hereby achieved, which further reduces the cooling time and improves the quality of the moulded product. It is even possible to make the gas flow repeatedly and alternately in opposite directions, e.g. 2–6 times.

The gas flow system for supply and removal of pressurized gas can be controlled by means of flow regulation.

The amount of pressurized gas, which flows through the mould cavity 21, the velocity of this flow and the temperature of the supplied gas are chosen in one embodiment, such that at least substantially as much heat Q is conveyed from the mould cavity via the pressurized gas as is conveyed through heat conduction in the moulding tool.

The temperature of the supplied gas can range from 10–30° C., more preferably from 20–25° C. and most preferably the temperature is at room temperature.

In another embodiment, where the cooling must be performed rather slowly, the temperature of the supplied gas is ranging from 30–80° C., more preferably from 40–70° C. and most preferably from 50–60° C. Within these temperature ranges the moulding tool is typically held at conventional gas assisted moulding in order to allow the polymer to "flow out" sufficiently, such that details having uniform surfaces without waves or the like are obtained. Further, the risks of clogging of the nozzles can be reduced.

In a further embodiment, wherein the flow velocity must be low (e.g. in order to avoid the problems of clogging), the supplied gas may be cooled to a temperature below room temperature, e.g. to a very low temperature by means of liquid nitrogen. In this respect, the same heat transport may be obtained by using a much lower flow velocity. It is also possible to choose another gas, e.g. helium, which has different heat conduction properties.

The pressure of the pressurized fluid has to be accurately controlled during the moulding. Typical pressures range from 50–200 bar.

Further, the moulding tool may comprise additional openings to the moulding tool for further supply and/or removal of pressurized gas. It is possible to image an arbitrary number of openings, which serve as inlets and/or outlets for the through flowing gas, particularly for the manufacture of more complicated products.

Figure 9:
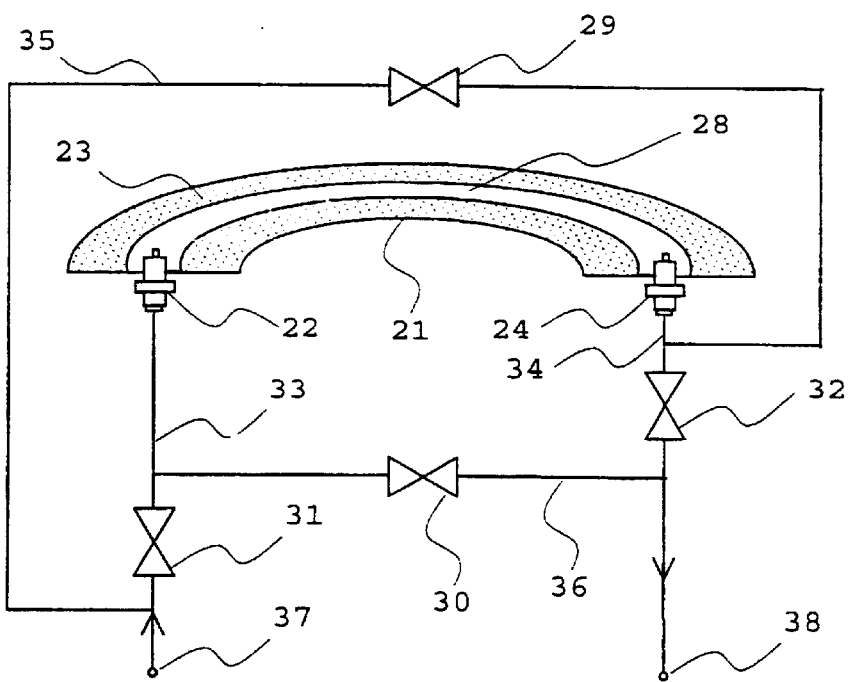
FIG. 9 shows an inventive example for controlling the cooling of the moulded product.

FIG. 9 shows schematically an inventive example for regulation of the cooling of the moulded product. A valve-based tubing system comprising valves 29–32 and tubing 33–36 is connectable to a controllable gas flow system (not shown) via switches 37, 38. Pressurized gas is supplied at 37 and removed at 38 in a regulated manner, such that a uniform flow of pressurized gas is achieved in the tubing system and a substantially constant pressure is achieved in the mould cavity 21.

The above described alterations of the flow direction through the mould cavity 21 may be achieved by opening and closing the valves 29–32 in the following way. First, valves 29 and 30 are held closed, while valves 31 and 32 are held opened. The pressurized gas entering at 37 is forced through tubing 33, through nozzle 22, through cavity 28 in the mould cavity 21 and out through nozzle 24, through tubing 34 and finally out from the system at 38. Thus, by simultaneously opening valves 29 and 30 and closing valves 31 and 32 the flow direction is altered in the flow cavity 21. The gas is here flowing in at 37 through tubing 35 and in through nozzle 24, through cavity 28 in mould cavity 21 and out through nozzle 22, through tubing 36 and out at 38. By opening valves 31 and 32 synchronously by closing valves 29 and 30 the flow direction is again altered. The procedure may be repeated a suitable number of times.

According to the present invention a technique is achieved, which increases the filling out of the polymer in the mould cavity in order to increase the quality of the moulded detail, at the same time as the cycle time can be most considerably shortened.

In summary, the technique includes the use of pressurized gas in gas assisted moulding for conventional, inner pressurizing of polymer injected into a mould cavity and further as a transportation medium in order to remove considerable amounts of heat from the mould cavity.

The present invention as hereby depicted solves the problems, which are associated with prior art. Certainly, it is not limited to the embodiments described above and illustrated in the drawings but can be modified within the scope of the appended claims.

What is claimed is:

1. A method in the fabrication of a moulded detail in a gas assisted moulded process, comprising steps of:

injecting molten polymer (23) into a mould cavity (21) of a moulding tool;

supplying pressurized fluid (25) to the mould cavity through at least a first opening (22) in order to form (13) a cavity (26) in the polymer and force (13) the polymer towards the inner walls of the mould cavity;

supplying pressurized fluid (27) to the mould cavity through at least a second opening (24), located remote from said first opening, to form (15) a passage (28) through the polymer to said cavity (26);

cooling and solidifying the polymer;

removing pressurized fluid from the mould cavity; and opening the mould cavity to remove the moulded detail, wherein while the polymer is cooled and solidified, pressurized fluid is flowed through the cavity (26) via substantially equal amounts of pressurized fluid being supplied (16) to the mould cavity through at least one of said openings (22, 24) and simultaneously removed (16) from the mould cavity through at least another one of said openings (24, 22);

wherein the pressure is held substantially constant in said mould cavity; and wherein the supplied amount has a lower temperature than the removed amount, such that heat (Q) is conveyed from the mould cavity via the flowed fluid and the cooling and solidifying are speeded up.

2. The method as claimed in claim 1, wherein substantially equal amounts of pressurized fluid are supplied (16) to the mould cavity through at least said other one of said openings (22, 24) and are simultaneously removed (16) from the mould cavity through at least said first of said openings (24, 22), while the polymer being cooled (16) and solidified, wherein the pressure is held substantially constant in said mould cavity; and the supplied amount has a lower temperature than the removed amount, such that heat (Q) is conveyed from the mould cavity via the arisen, oppositely directed fluid flow, whereby a more uniform, speeded up cooling is achieved.

3. The method as claimed in claim 1, wherein the supplied and removed amounts are selected to be supplied and removed through said openings, such that the arisen fluid flow is arranged repeatedly and alternately to flow in opposite directions.

4. The method as claimed in claim 3, wherein the direction of the flowed fluid is altered 2–6 times.

5. The method as claimed in claim 1, wherein the amount of pressurized fluid supplied to and removed from the mould cavity is controlled by means of flow regulation.

6. The method as claimed in claim 5, wherein the amount of pressurized fluid supplied to and removed from the mould cavity is arranged to flow in a valve-based tubing system.

7. The method as claimed in claim 1, wherein the amount of pressurized fluid supplied to and removed from the mould cavity, a velocity of the supply and removal, and a temperature of the supplied amount are selected such that at least substantially the same amount of heat (Q) is conveyed from the mould cavity through the pressurized fluid as is conveyed via heat conduction in the moulding tool.

8. The method as claimed in claim 1, wherein the temperature of the amount of supplied fluid is selected to be in the range of 10–30° C.

9. The method as claimed in claim 1, wherein temperature of the amount of supplied fluid is selected to be in the range of 30–80° C.

10. The method as claimed in claim 1, wherein the temperature of the amount of supplied fluid is selected to be below room temperature.

11. The method as claimed in claim 1, wherein the temperature of the moulding tool is selected to be in the range of 30–80° C.

12. The method as claimed in claim 1, wherein a pressure of the pressurized fluid is selected to be in the range of 50–200 bar.

13. The method as claimed in claim 1, wherein the pressurized fluid is selected to be one of nitrogen gas and a nitrogen-containing gas mixture.

14. The method as claimed in claim 1, wherein said passage is formed with a smallest cross section area, which is larger than at least the cross section areas of the first and the second openings.

15. The method as claimed in claim 1, wherein said passage is formed with a smallest cross section area, which is repeatedly achievable.

16. The method as claimed in claim 1, wherein the molten polymer (23) is injected (11) into the mould cavity (21) through said first opening (22).

17. The method as claimed in claim 1, wherein the molten polymer (23) is injected (11) into the mould cavity (21) through a separate polymer injection opening located remote from said first ans second openings (22, 24).

18. The method as claimed in claim 1, wherein the first and the second opening are selected to be localized at substantially different ends of the mould cavity.

19. The method as claimed in claim 1, wherein at least a third opening for supply and removal of pressurized fluid is provided.

20. The method as claimed in claim 1, wherein the pressurized fluid in the mould cavity is removed (17) through some of said openings.

21. A moulding system for the manufacturing of a moulded detail in a gas assisted moulding process, the system comprising a mould cavity (21) defining the detail to be moulded;

a polymer injection opening to said mould cavity, through which molten polymer (23) is injectable;

a first gas injection opening (22) to said mould cavity, through which pressurized fluid (25) is capable of being supplied to form a void in the polymer and force the molten and injected polymer towards the inner walls of the mould cavity;

a second gas injection opening (24) localized remote from said first gas injection opening, through which second gas injection opening pressurized fluid (27) is capable of being supplied to form a passage (28) through the polymer to said void;

means for cooling and solidifying the molten polymer;

a valve-based tubing system (29–36) connected to said openings (22, 24); and means for supplying to the mould cavity through at least one of said openings (22, 24) and simultaneously removing (16) from the mould cavity through another one of said openings (24, 22) via said tubing system substantially equal amounts of pressurized fluid, while the polymer is being cooled and solidified, whereby the pressure is held substantially constant in said mould cavity; and the supplied amount has a lower temperature than the removed amount, such that heat (Q) is conveyed from the mould cavity via the arisen fluid flow and the cooling and solidification are speeded up.

22. The system as claimed in claim 21, wherein said system is arranged such that substantially equal amounts of pressurized fluid are supplied (16) to the mould cavity through said another of said openings (22, 24) and are simultaneously removed (16) from the mould cavity through said one of said openings (24, 22) via said tubing system, while the polymer being cooled (16), whereby the pressure is held substantially constant in said mould cavity and the supplied amount has a lower temperature than the removed amount, such that heat (Q) is conveyed from the mould cavity via the arisen, oppositely directed fluid flow, whereby a more uniform, speeded up cooling and solidification are achieved.

23. The system as claimed in claim 21, wherein said system is arranged for supply and removal of pressurized fluid through said openings, such that the arisen fluid flow is arranged to flow repeatedly and alternately in opposite directions.

24. A method in the fabrication of a moulded detail in a moulding process, wherein pressurized fluid (25) is supplied (12) to a mould cavity (21), and wherein, while the moulded detail being cooled, pressurized fluid is arranged to flow through the mould cavity, whereby the pressure in the mould cavity is kept substantially constant and the fluid flowing into the mould cavity has a temperature which is lower than the temperature of the mould cavity, whereby heat (Q) is conveyed from the mould cavity via the fluid flow and the cooling is speeded up.

\* \* \* \* \*